INVENTORS
WARD R. GOODRICH
FRANCIS D. WITINSKI
ATTORNEYS

INVENTORS
WARD R. GOODRICH
FRANCIS D. WITINSKI
BY
ATTORNEYS

United States Patent Office 3,526,338
Patented Sept. 1, 1970

3,526,338
METHOD AND CONTROLLER FOR DISPENSING ELECTROSCOPIC MATERIAL
Ward R. Goodrich, Webster, and Francis D. Witinski, Rochester, N.Y., assignors to Xerox Corporation, Rochester, N.Y., a corporation of New York
Filed Jan. 2, 1968, Ser. No. 695,244
Int. Cl. B67d 5/08
U.S. Cl. 222—1                                   11 Claims

ABSTRACT OF THE DISCLOSURE

Apparatus for controlling the density of xerographic toner powder images created on a support surface comprising transparent electrically conductive electrodes positioned in cooperative relation to flowing xerographic developer material and including a pulse generator and switching circuit to alternate the polarity of the electrodes for attracting and repelling xerographic toner powder from the electrode surface. A pair of photoelectric sensors connected into an appropriate bridge circuit are positioned adjacent the electrodes in the light path from a suitable source of light. The unbalanced output from this bridge circuit is connected to a threshold detector for controling the actuation of a dispensing motor for driving a toner dispensing apparatus. The electrodes, pulse generator, switching circuit, and threshold detector are connected into a control circuit to determine and control the concentration of xerographic toner powder in the developing mixture and to ensure the proper polarity of the electrodes to prevent false triggering of the threshold detector.

BACKGROUND OF THE INVENTION

This invention relates to xerographic development and in particular to a novel control adapted to sense the concentration of electroscopic toner powder in a xerographic developer mixture.

More specifically, the invention relates to a control for use with an electrically conductive transparent material whereby the concentration of the electroscopic toner powder in a xerographic developer mixture is ascertained at a predetermined time as the mixture is passing adjacent to the electrically conductive material to thereby activate a dispenser motor to dispense additional toner powder into the developer mixture when the toner concentration is below a predetermined minimum.

In the process of xerography, a xerographic plate comprising a layer of photoconductive material on a conductive backing is given a uniform electric charge over its surface and then exposed to the subject matter to be reproduced by various projection techniques. This exposure discharges the plate in accordance with the light intensity reaching it, thereby creating a latent electrostatic image on or in the plate.

Development of the image is effected by developers which comprise, in general, a mixture of suitable pigmented or dyed resin-based powder, hereinafter referred to as toner, and a granular carrier material which functions to generate triboelectric charges on, and to carry the toner. More specifically, the function of the carrier material is to provide mechanical control of the toner, or to carry the toner to an image surface and simultaneously provide almost complete homogeneity of charge polarity. In the development of the image, the toner powder is brought into surface contact with the photoconductive coating and is held thereon electrostatically in a pattern corresponding to the latent electrostatic image. Thereafter, the developed xerographic image may be transferred to a support material to which it may be fixed by any suitable means such as heat fusing.

In the mixture of toner particles and carrier material, the toner particles, which are many times smaller than the carrier material, adhere to and coat the surface of carrier material due to the triboelectric attraction therebetween. During development, as the toner-coated carrier material rolls or tumbles over the xerographic plate carrying an electrostatic image of opposite polarity to the charge on the toner, toner particles are pulled away from the carrier by the latent electrostatic image and deposited on the plate to form a developed toner-powder image. As toner-powder images are formed, additional toner powder must be supplied to the developer mixture to replenish the toner deposited on the xerographic plate. The toner material may be of the type disclosed in Carlson Pat. No. 2,940,934, wherein the toner particles comprise a finely divided pigmented resin having a particle size less than 20 microns and preferably an average particle size between about 5 and 10 microns and comprising a finely divided uniform mixture of pigment in a non-tacky, low-melting resin. Desirably, the pigment will be a black pigment such as carbon black or other minutely divided carbonaceous pigment.

As the toner powder in the developer mixture is depleted during the development of the latent image on the xerographic plate, more toner powder must be added to maintain a desirable level of copy density. In the event that too much toner powder is added to the developer mixture, heavy deposits of toner in the image areas in combination with an undesirable deposit of toner in the non-image or background areas results in producing prints of poor contrast with blotchy images or poor resolution.

In addition, overtoning by the operator adds to the severity of toner powder accumulation on critical machine components such as the Corotrons, illumination system, optical system, fuser and transport system, as well as necessitating more frequent replacement of filter bags and cleaning brushes. Thus, with an automatic toner-powder control system incorporated in a xerographic machine to regulate the concentration of toner powder in the developer mixture, fewer service calls are necessary to keep the quality of the xerographic reproductions at a high level.

In automatic reproducing machines such as shown in FIG. 1 a moving xerographic plate, which may be in the form of a cylinder, is exposed to a light source to create a latent electrostatic image to be developed by appropriate means such as a continuous flow of developer material over the plate surface. It is necessary, in order to produce prints of consistently good copy density to vary the toner dispensing rate in accordance with the rate of consumption which is correlated to the type and frequency of copy being reproduced. The dispensing of toner in prior art devices has been dependent upon the machine operator visually inspecting the finished copy and manually adjusting for the toner concentration by appropriate changes in a machine setting. It is readily apparent that dispensing by this means results in image densities largely dependent on an alertness and ability of the operator to visually evaluate the density of the copy image. Not only must the operator detect the need for a setting change, but the operator must be able to accurately effect the proper degree of change through the disperser setting. In the event that the operator oversets the dispensing rate and excess toner is added to the developer mixture, the only means whereby the toner concentration may again become acceptable is through normal depletion by reproduction of a sufficient number of additional copies. Considerable waste of material and time usually occurs when the proper setting of toner concentration has to be determined by an operator, since setting changes are usually made only after copy deterioration has become apparent.

An improved system for controlling the concentration of toner powder in the developer mixture would continually inspect the concentration of the toner powder in the developer mixture at the time an electrostatic latent image is being developed on the xerographic drum. This concentration would be automatically adjusted to achieve the optimum proportion of toner powder to carrier material so that each individual copy will be developed by an optimum developer mixture.

SUMMARY OF THE INVENTION

It is, therefore, an object of this invention to improve xerographic developing.

Another object of this invention is to improve xerographic developing by automatically adjusting the concentration of toner powder in the developer mixture.

A further object of this invention is to improve xerographic developing by sensing the developer mixture at the time the latent electrostatic image of the xerographic drum is being developed.

These and other objects are attained in accordance with the present invention wherein there is provided a transparent electrically conductive material positioned in cooperative relationship with the developer mixture of a xerographic reproducing machine and connected into an appropriate electrical circuit including a pulse generator, a photoelectric sensor, a threshold detector and a dispensing motor to operate a toner dispenser for adding toner powder into the developer mixture.

DESCRIPTION OF THE DRAWINGS

Further objects of this invention together with additional features contributing thereto and advantages accuring therefrom, will be apparent from the following description of several embodiments of the invention when read in conjunction with the accompanying drawings wherein.

Figure 1:
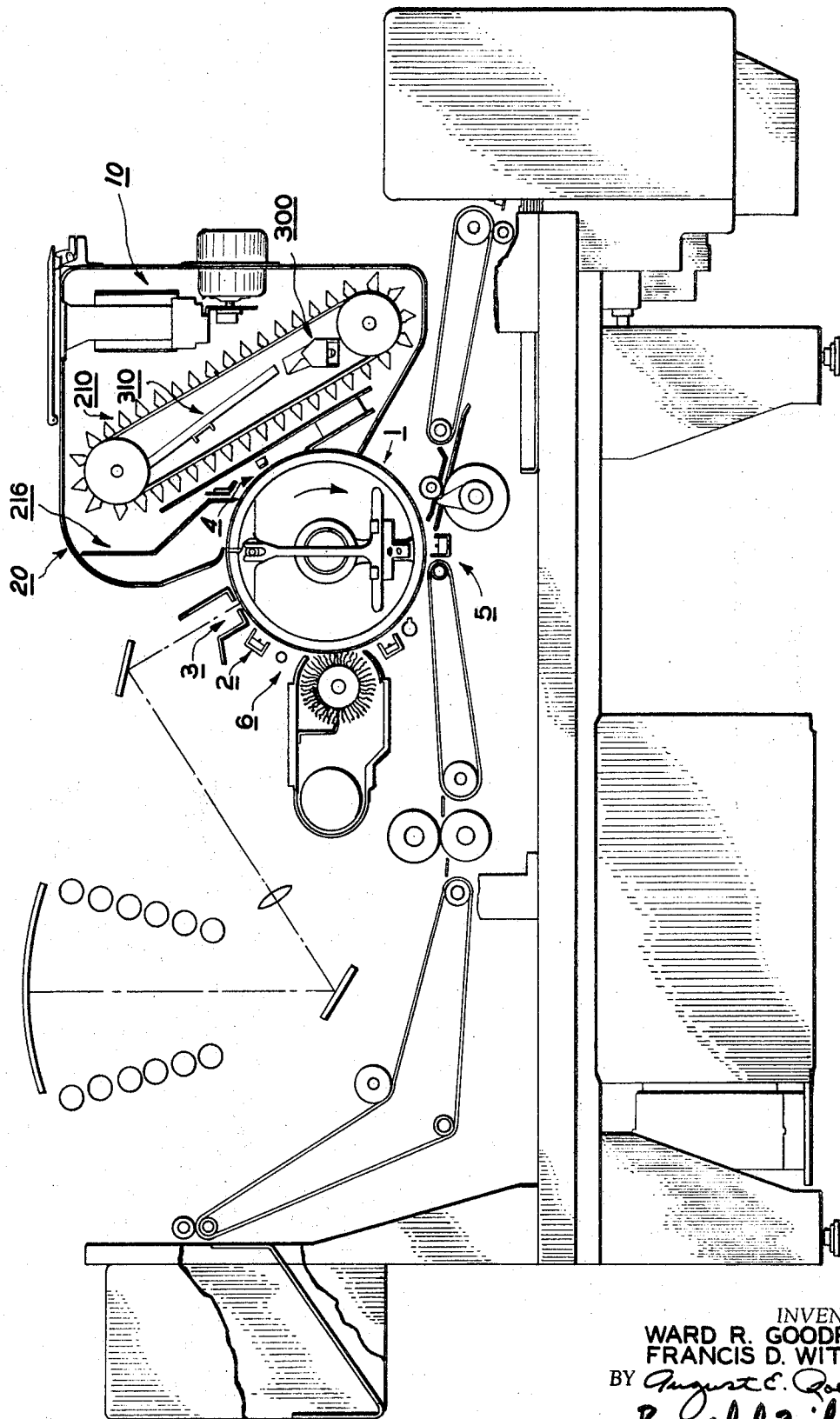
FIG. 1 is a front elevation view of an automatic xerographic reproducing machine utilizing the invention of this application.

Referring now to the drawings, there is shown in FIG. 1 an embodiment of the subject invention in a suitable environment such as an automatic xerographic reproducing machine, although it should be noted that the invention is not intended to be limited thereto.

The automatic xerographic reproducing machine includes a xerographic plate 1 including a photoconductive layer or light receiving surface on a conductive backing, journaled in a frame to rotate in the direction indicated by the arrow to cause the plate surface to sequentially pass a series of xerographic processing stations.

For the purpose of the present disclosure, the several xerographic processing stations in the path of movement of the plate surface may be described functionally, as follows:

A charging station 2 at which a uniform electrostatic charge is deposited on or in the photoconductive plate;

An exposure station 3 at which a light or radiation pattern of copy to be reproduced is projected onto the plate surface to dissipate the charge in the exposed areas thereof to thereby form a latent electrostatic image of the copy to be reproduced;

A developing station 4 at which the xerographic developing material, including toner particles having an electrostatic charge opposite to that of the latent electrostatic image, is cascaded over the plate surface whereby the toner particles adhere to the latent electrostatic image to form a toner-powder image in configuration of the copy being reproduced;

A transfer station 5 at which the toner-powder image is electrostatically transferred from the plate surface to a transfer material or a support surface; and A drum cleaning and discharge station 6 at which the plate surface is brushed to remove residual toner particles remaining thereon after image transfer, and exposed to a relatively bright light source to effect substantially complete discharge of any residual electrostatic charge remaining thereon or therein.

DESCRIPTION OF THE PREFERRED EMBODIMENT

Figure 2:
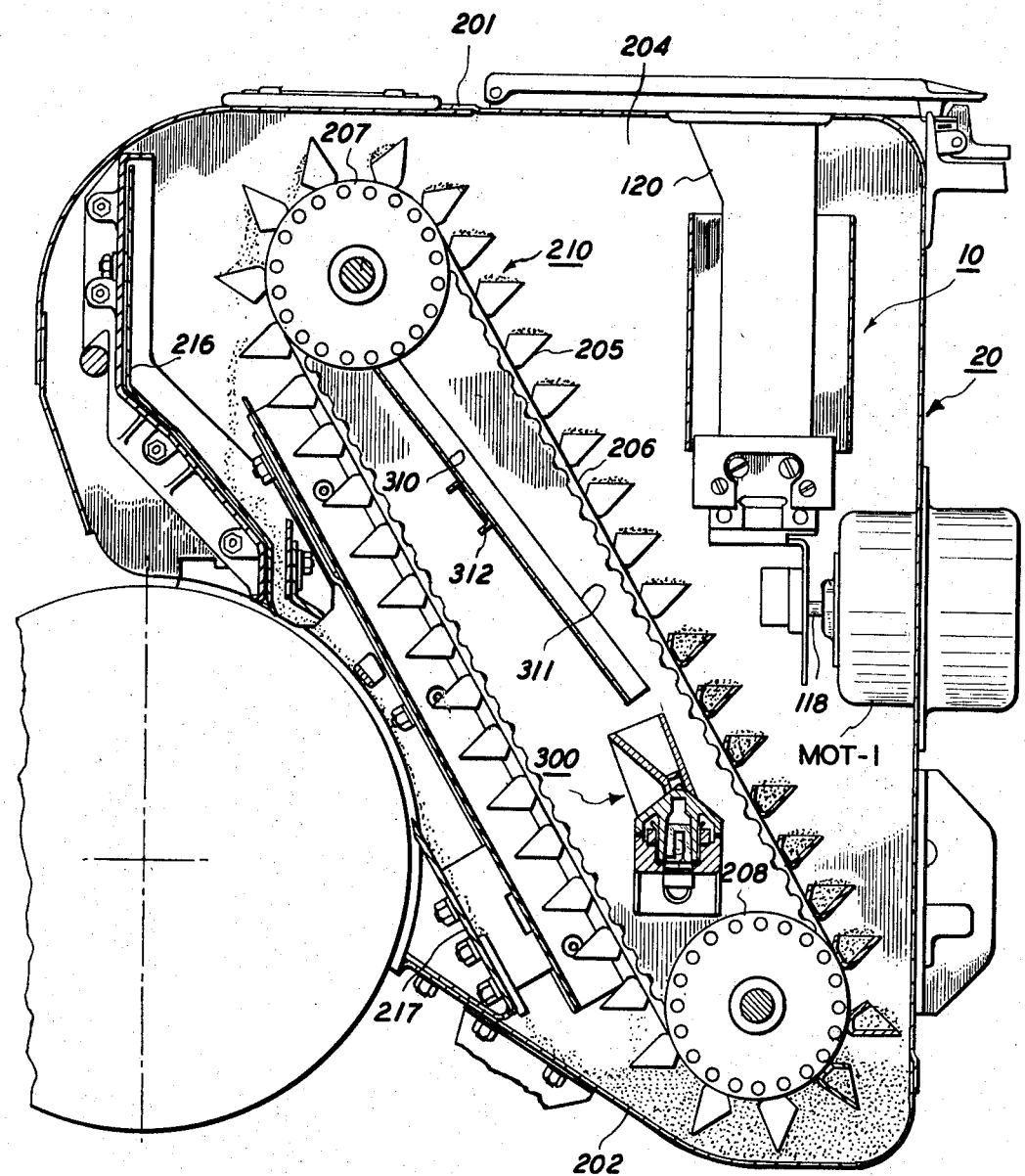
FIG. 2 is an enlarged front elevation of the developer apparatus of the automatic reproducing machine with parts broken away to better illustrate the sensor apparatus of this invention.
Figure 3:
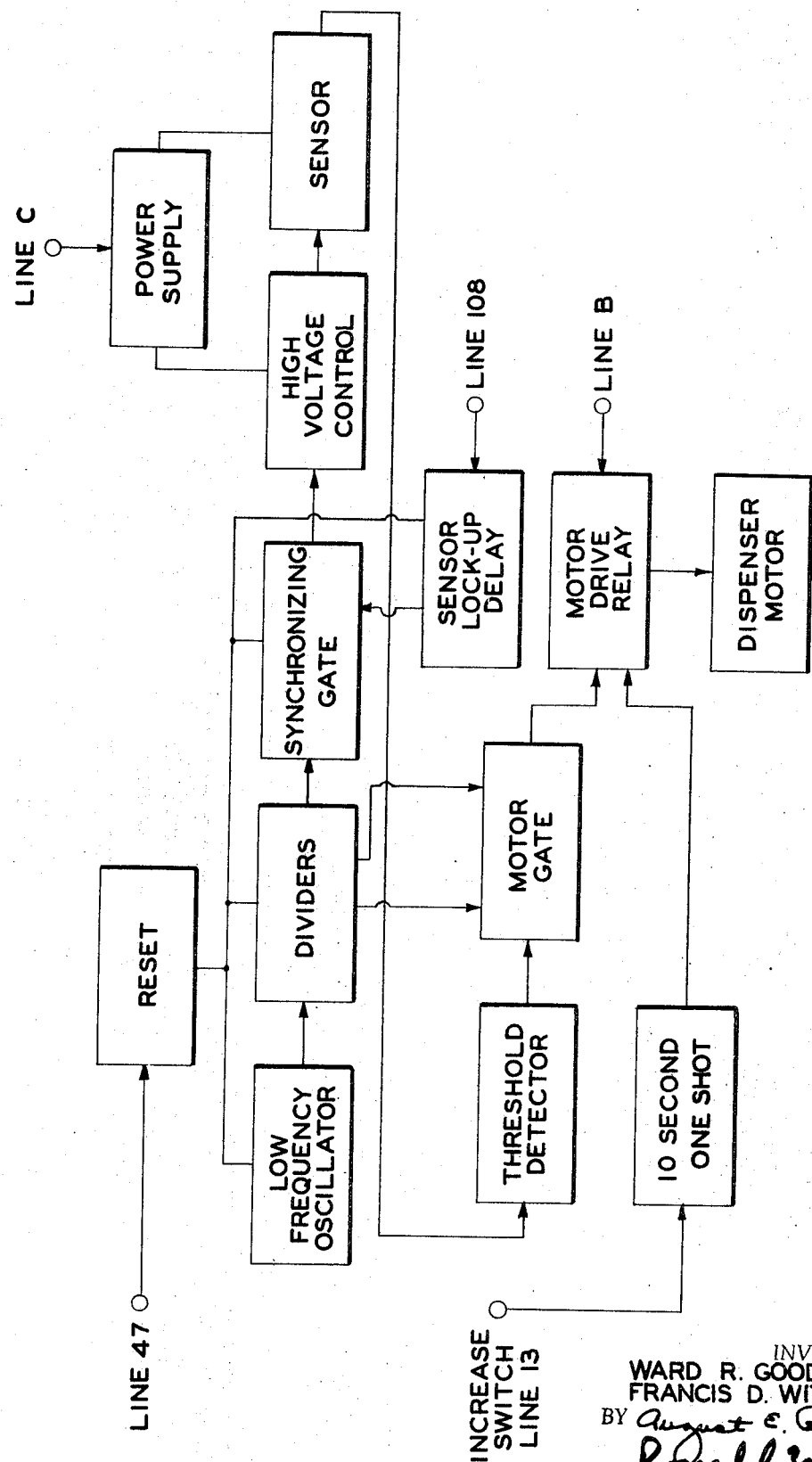
FIG. 3 is a logic block diagram of one embodiment of the control circuit of the invention.

It it felt that the preceding description of the xerographic process is sufficient for a better understanding of this invention. Referring now to the subject matter of the invention as best shown in FIGS. 1 and 2, the developing station which effects development of the latent electrostatic image of the cylindrical xerographic plate, comprises a developer apparatus 20 which coacts with the cylindrical plate to develop the latent electrostatic image on or in the plate surface by means of the xerographic toner-powder. Mounted within the developer housing is a driven bucket-type conveyor 210 used to carry the developer material previously supplied to the developer housing to the upper portion of the developer housing from which point the developer material is cascaded over the hopper chute 216 onto the drum. As the developer material cascades over the drum, toner particles of the devoloper material adhere electrostatically to the previously formed latent electrostic image areas on the drum 1, the remaining developer material falling off the peripheral surface of the drum to be deflected by baffle plates 217 into the bottom of the developer housing. Toner particles consumed during the developing operation to form the visible powder images are replenished by a toner dispenser 10 mounted within the developer housing.

Specifically, the developer assembly 20 includes the box-like developer housing having a top wall 201, angular bottom wall 202, a front wall (not shown) and rear wall 204, forming in the lower portion thereof a reservoir for developing material. The front wall and rear wall 204 (as shown in FIG. 2) are formed with a concave edge portion in conformity with the shape of the xerographic drum to permit the developer housing to be positioned closely adjacent thereto. Secured to the inside faces of the developer housing are suitable baffle plates, not shown, which prevent excessive dust and air currents from circulating within the developer housing adjacent to the cylindrical xerographic plate.

The bucket-type conveyor 210 is used to convey developer material from the reservoir portion of the developer housing to the upper portion of the developer housing from where it is cascaded over the xerographic drum. As shown, the conveyor 210 includes a series of parallel spaced buckets 205 secured to a suitable pair of conveyor belts 206 passing around a conveyor drive pulley 207 and a conveyor idler pulley 208 secured on appropriate drive and idler shafts to rotate therewith.

To deflect the developing material and to spread this material across the face of the drum as the developing material is emptied out of the conveyor buckets by gravity, a flanged hopper chute 216 is secured as by welding to the side walls of the developer housing. As the xerographic drum rotates, developing material previously spilled from the buckets onto the flanged hopper chute will cascade over the drum and eventually fall off or be thrown off the drum surface. To catch the developing material that falls from the xerographic drum so that it may be returned to the reservoir in the developer housing, a pick-off baffle 217 is secured to the bottom wall 202 of the developer housing. The leading edge of the pick-off baffle 217 is positioned closely adjacent to the peripheral surface of the xerographic drum but out of contact therewith to catch the developing material as it falls from the drum surface. Any developing material not caught and returned to the reservoir of the developer housing by the pick-off baffle is caught by a pan (not shown) held in place by any suitable means secured to the bottom wall 202 of the developer housing. As a supply of developing material accumulates in this pan it must be manually removed by an operator and returned to the developer housing. For further details concerning the specific details of construction for a suitable developer apparatus reference is made to W. G. Lewis et al. U.S. Pat. No. 3,067,720.

As the developing mixture is cascaded over the xerographic drum, toner particles are pulled away from the carrier and deposited on the drum to form toner-powder images, while the partially denuded carrier particles pass off the drum into the reservoir. As toner powder images are formed, additional toner particles must be supplied to the developing mixture in proportion to the amount of toner deposited on the drum. To supply additional toner particles to the developing mixture, the toner dispenser 10 is used to accurately meter toner to the developer mixture. Although any one of a number of well-known powder or granulated material dispensers may be used, the toner dispenser shown in (FIG. 2) is of the type disclosed in U.S. Pat. No. 3,013,703, issued Dec. 19, 1961, to R. A. Hunt.

The toner dispenser 10 comprises a hopper or container 120 for the toner particles to be dispensed. Although the hopper or container 120 may be made in any size or shape, the hopper shown in formed as a rectangular open-ended box having vertical side and end walls, the upper ends of the walls being bent outward to form horizontal flanges by means of which the hopper may be attached to the underside of top wall 201 of the developer housing, as by welding, with the opening in top wall 201 of the developer housing in alignment with the opening in the hopper. At opposite ends of the hopper are positioned depending bearing blocks for supporting the remaining elements of the toner dispenser, the bearing blocks being appropriately attached to the end walls.

The bottom of the hopper is partially closed by a dispensing plate positioned in spaced vertical relation below the lower edges of the walls of the hopper which combines with the walls of the hopper 120 to provide a reservoir having narrow elongated outlet slits or passages for the flow of toner powder. In the operation of the toner dispenser a supply of toner powder is placed within the hopper, the hopper walls and the dispensing plate forming a reservoir for the toner particles. Upon reciprocation of the dispensing plate, a metered quantity of toner powder will be permitted to pass through the plate, where they will fall to the reservoir portion of the developer housing.

Since the toner dispenser 10 dispenses a uniform quantity of toner for a given stroke of the dispensing plate it is apparent that the quantity of toner delivered by the toner dispenser may be altered by varying the number of strokes per unit of time. Reciprocation of the dispensing plate is effected by means of an eccentric secured to the end of a shaft 18 coacting with a bifurcated lever arm secured to the dispensing plate.

It is felt that the preceding description of the toner dispenser 10 is sufficient for a better understanding of the subject matter of this invention. For further details relative to the specific construction of this device, reference is made to the aforementioned Hunt patent.

In order to control the dispensing of toner from the toner dispenser 10, there is shown in FIGS. 2–9 the details of an automatic toner control system which ultimately energizes the dispensing motor MOT-1 in accordance with the density of an image developed in a xerographic drum simulator 300.

A xerographic drum simulator, to be hereinafter described in detail, is secured within the developer housing 20 by suitable brackets which electrically insulate the simulator chamber from the surrounding structure. A collecting funnel 310 having depending side portions 311 adapted to contain a quantity of xerographic developer material is secured to support plate 312 fastened to the front and rear developer housing frame plates for maintaining the collecting funnel, and simulator chamber 300 secured thereto, beneath the moving buckets 205 of the conveyor system to receive the overflow of developer material falling from each bucket as it progresses to cascade the developer material onto the xerographic plate. The collecting funnel 310, as shown in FIG. 2, is positioned at an angle relative to the vertical in such a way as to catch the falling developer material and to guide the material into the simulator apparatus 300.

The simulator apparatus 300 (FIGS. 6–8) includes photoelectric sensors P–1 and P–2 positioned in the path of light emanating from lamp LMP–1 to vary the resistance of the sensors P–1 and P–2 in proportion to the light intensity impinging thereon. Photosensor P–1 is positioned adjacent lamp LMP–1 to compensate for any variations in the light intensity due to aging or dust accumulation within the simulator apparatus. The two photosensors P–1 and P–2 are electrically connected in a conventional bridge circuit whereby the changes in resistance of the photosensors are interpreted as changes in voltage, to thereby compensate the output voltage from the photosensor P–2 for the above variations. Interposed in the light path emanating from lamp LMP–1 to photosensor P–2, are a pair of electrically conductive transparent electrodes 350 each divided into two electrically isolated adjacent areas 350(a) and 350(b) for charging each of the areas of the electrodes to a desired polarity. A suitable type of electrode would be a tine oxide coated glass plate manufactured by Pittsburgh Plate Glass Inc. under the trade name of NESA Glass. The transparent electrodes are secured in position within the simulator chamber 301 by means of a spring 302 biasing the electrodes against a boss portion of the simulator chamber and are sealed in this position by a suitable sealant for a purpose to be hereinafter discussed. The simulator chamber comprises a hollow sealed member having an orifice in the upper portion through which the overflow of xerographic developer material is passed by means of the collecting funnel 310, the orifice being of a size such that a quantity of developer material is maintained in the collecting funnel at all times during operation of the developer apparatus 20. Positioned within the simulator chamber 301 adjacent the control orifice, is a flow divider 303 for diverting an equal amount of xerographic developer material over each of the transparent electrically conductive electrodes 350. After the xerographic developer material has passed over the transparent electrodes, it flows out from the xerographic drum simulator through an aperture 304 in the bottom of the simulator chamber 301 to return to the sump portion of the developer housing 20. The purpose of the xerographic drum simulator being a sealed unit, except for the path of developer material flowing through the control orifice in the top of the simulator chamber and cascading over the transparent electrodes and out of the simulator, is to preclude the normal toner powder dust atmosphere within the developer housing 20 from depositing on the photosensors P–1 and P–2 or the lamp LMP–1. With the xerographic drum simulator being positioned and constructed in this manner, the same xerographic developer mixture that is being delivered to the xerographic drum for development of the latent electrostatic image is utilized as a sample which is cascaded across the transparent electrodes, which simulate the photoreceptive drum, in the same manner as the developer mixture is applied to the drum surface. The two transparent electrically conductive electrodes have similar electrically isolated adjacent conductive areas 350(a) and 350(b) as best shown in FIG. 7. The patterns describing the conductive areas 350(a) and 350(b) of each electrode are similar, with areas 350(a) being electrically connected to terminal 15 and areas 350(b) being electrically connected to terminal 10 of the electrical schematic shown in FIG. 4(b) to which a suitable DC potential is applied.

Figure 4A:
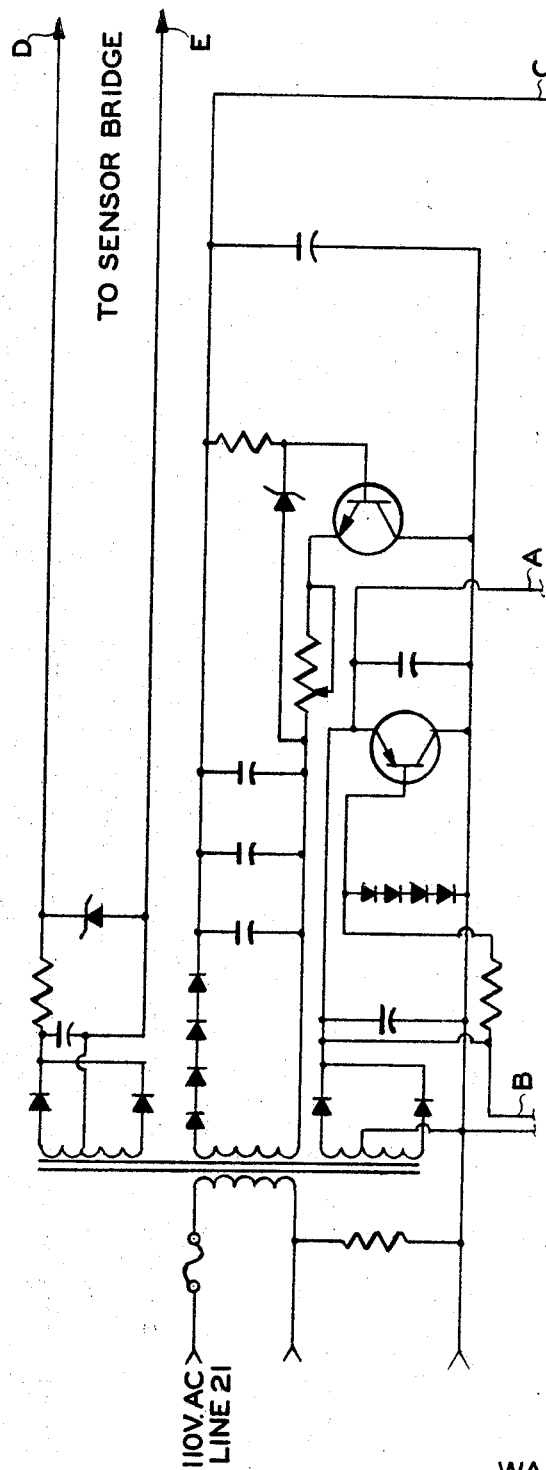
FIGS. 4(a) and 4(b) are, respectively, electrical schematics of the power supply and logic of the block diagram of FIG. 3.
Figure 4B:
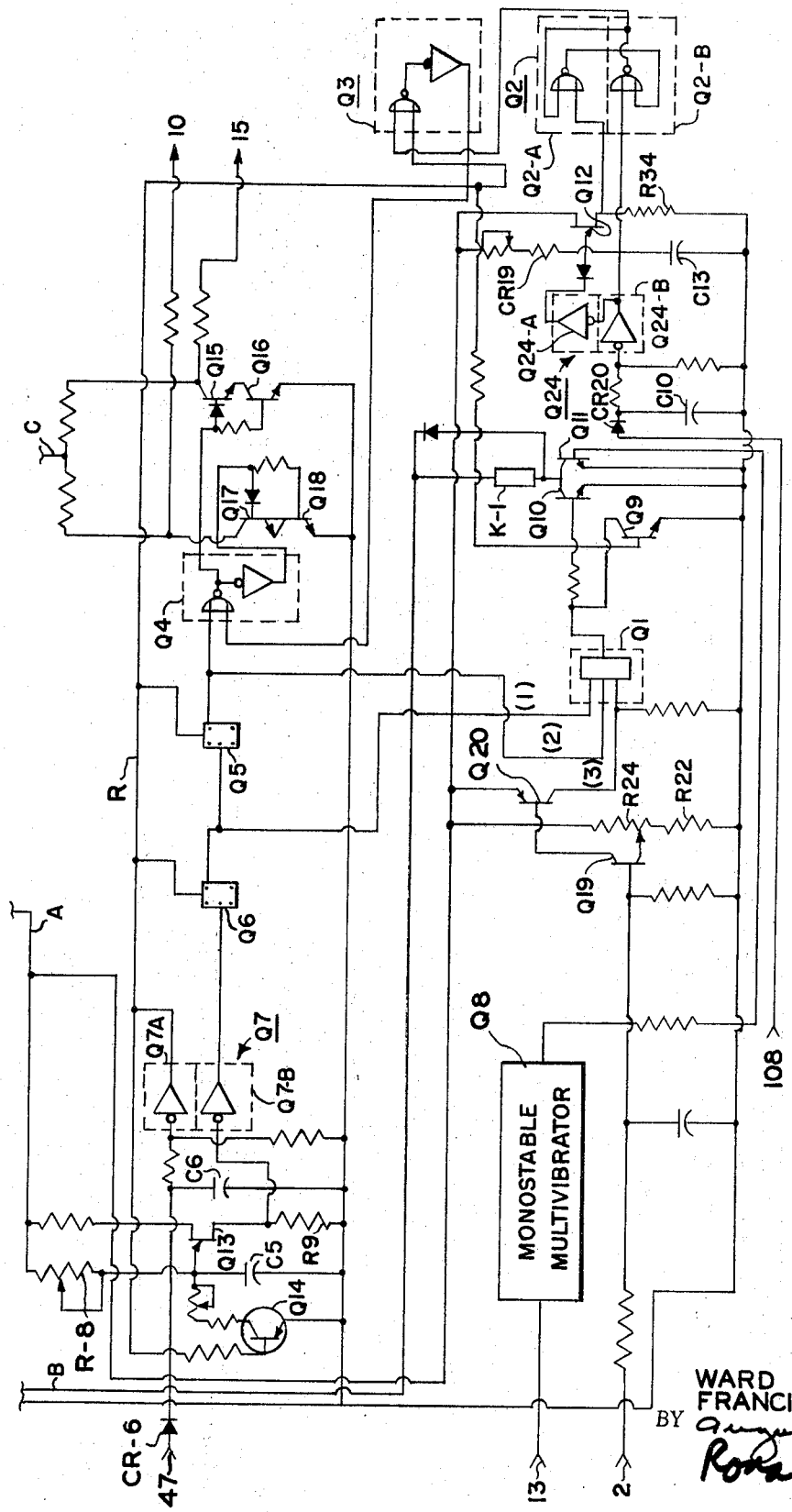

Referring now to FIG. 4(b), when line 47 is energized with 110 volts AC, as by pressing the start-print button on the automatic xerographic reproducing machine shown in FIG. 1, it provides an AC voltage which is rectified through diode CR–6 driving the input of the reset portion (Q7–A) of reset/inverter Q7 to a high state (referred to as a logic "1" condition or simply "1"), which is inverted through the inverter (Q7–B) to a low state (referred to as a logic "0" condition or simply "0") to thereby decrease the voltage of reset line R to a low condition ("0") removing the voltage from the base of oscillator synchronizing transistor Q14, turning Q14 off or placing Q14 in a non-conducting state. The decreasing voltage on the reset line R will also decrease the voltage to the flip-flop divider Q6 and the second flip-flop divider Q5 removing the hold from the reset line to these dividers. The decrease in voltage of reset line R is coupled to the synchronizer flip-flop Q3, inverted by means of the "NOR" gate, the output of which is again inverted by the inverter of Q3 providing a low input to the NOR gate of Q4 thereby providing a high output to the high voltage gate transistors Q15 and Q16 allowing them to conduct and providing a low input to the base of high voltage gate transistors Q17 and Q18 by means of the inverter of Q4 turning these transistors off or placing them in a non-conducting state to thereby place terminal 10 approximately 290 volts above terminal 15 to insure a proper polarity of the transparent electrodes.

Figure 5:
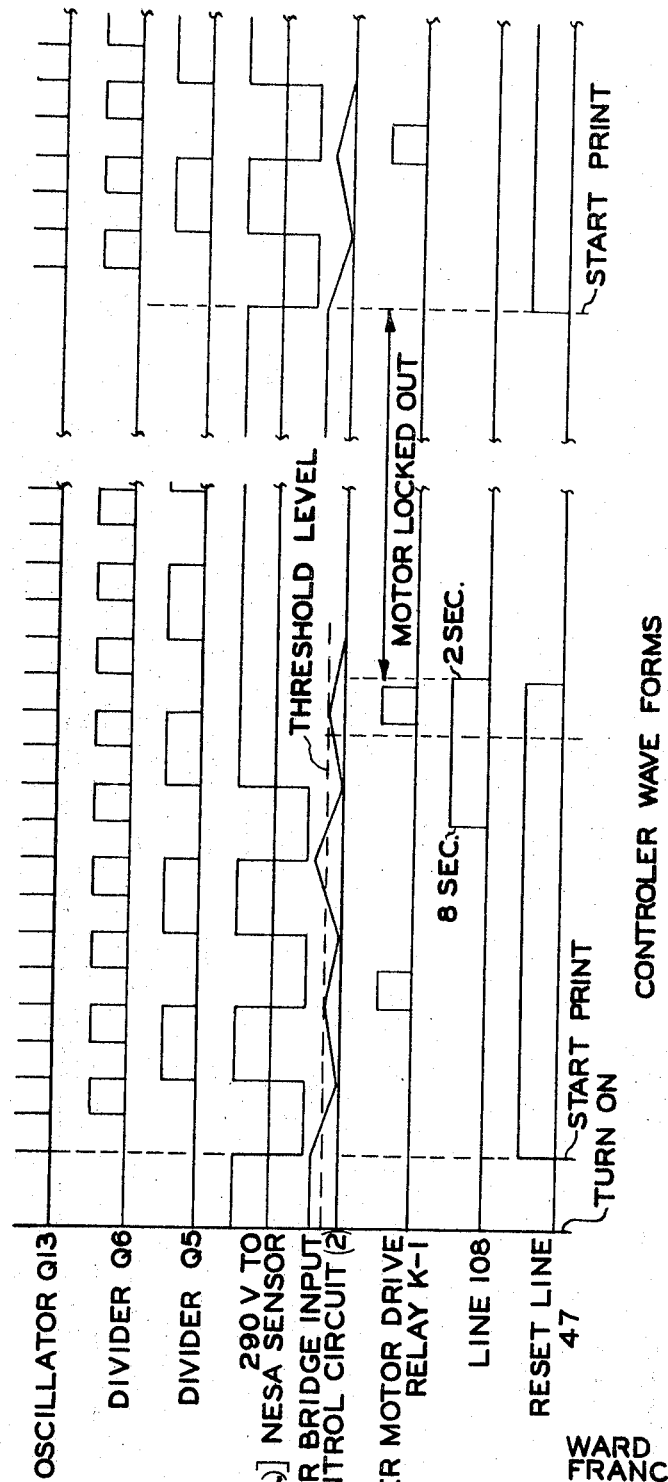
FIG. 5 is a timing diagram of the electrical schematic shown in FIGS. 4(a) and (b)

When the base of the oscillator synchronizing transistor Q14 is driven to a "0" by the decreasing voltage of the reset line R, placing the transistor in a non-conducting state, the capacitor C5 will begin charging to a voltage sufficient to fire the unijunction oscillator Q13 to discharge the capacitor C5, at which time the unijunction will no longer conduct and the capacitor will again begin charging providing a pulsating waveform, shown in FIG. 5, across resistor R9 thereby coupling a positive voltage spike to the inverter Q7–B of the reset/inverter Q7 which produces a negative-going pulsating waveform and fed to the toggle of the first flip-flop divider Q6. The negative going pulse from the inverter drives the output from the flip-flop divider from an existing "0" state to a "1" where the output will remain until the next negative-going pulse is fed from the inverter into the toggle of Q6 to drive the output again to a "0" state. The output of the first flip-flop divider Q6, or more precisely the negative-going edge of the "0" pulse, is coupled into the toggle of the second flip-flop divider Q5 which functions in the same manner as Q6 to change the output of the second flip-flop divider to a "1" state until receiving the next negative-going pulse from the first flip-flop divider Q6, at which time the output of Q5 will again revert to the "0" state. The high output from the flip-flop Q5 is then coupled to the NOR gate of the high voltage steering gate Q4 which is inverted, thereby providing a "0" pulse to the high voltage switch transistors Q15 and Q16 which will prevent their conducting. Since the high voltage switch transistors Q15 and Q16 are in a non-conducting state, the collector of transistor Q15, and therefore terminal 15 of the sensor 300, will be at a potential of approximately 290 volts as provided through line C, and terminal 10 will be at ground due to the low pulse from the NOR gate being inverted through the inverter of the high voltage steering gate Q4 to place a high on the base of the high voltage switch transistors Q17 and Q18 allowing these transistors to conduct. As heretofore described, the terminals 10 and 15 are connected each to one of the electrically isolated portions of the transparent electrodes whereby as the polarity between the terminals is cycled, toner powder will be cyclically attracted and repelled from the electrode surfaces 350(a). This polarity between the terminals will be switched, with terminal 10 being 290 volts and terminal 15 being ground, at a time predetermined by the low frequency unijunction oscillator cycling through a charging and discharging cycle having an RC charging time constant of R8 and C5 which is preferably 2¼ seconds. The negative-going edge of the waveform of Q5, as shown in FIG. 5, will provide a "1" state output from the NOR gate of high voltage steering gate Q4 driving the base of the high voltage switch transistors Q15 and Q16 positive to allow them to conduct, thereby placing terminal 15 at ground and the same pulse being inverted through the inverter of the high voltage steering gate Q4 to place the high voltage switch transistors Q17 and Q18 in a non-conducting state thereby driving their collectors to a voltage of approximately 290 volts, placing terminal 10 at that voltage.

In summary, as shown in FIG. 5, the voltage polarity applied to the transparent electrically conductive electrodes will be altered in accordance with the output from the low frequency unijunction oscillator Q13 fed through the inverter Q7–B of reset/inverter Q7 and divided by the first and second flip-flop dividers Q6 and Q5 respectively. This output from the flip-flop divider Q5 provides an output which is coupled into the high voltage steering gate Q4 to alternate the polarity of the two electrically isolated portions of the transparent electrically conductive electrode plates coupled to terminals 10 and 15. As the polarity is switched between terminals 10 and 15, the static charge is alternated on the transparent electrodes causing the toner powder to be alternatively attracted and repelled from the electrode areas 350(a).

As previously stated, the transparent electrically conductive electrodes are positioned within the simulator 300 which is supported inside the developer housing 20 adjacent the collection chute 310 by means of appropriate brackets. The developer material which is collected from the spillage of the buckets 205 traveling along the conveyor belt 210 will cascade over the transparent electrode surfaces, flowing out the bottom of the sensor chamber 300 and falling into the sump of the developer mechanism. As the developer material is cascaded across the electrode surface, a toner powder image is built on the portion of the electrodes which is charged to a polarity opposite to that of the charge on the toner powder. Since the two adjacent but electrically isolated portions of an electrode 350 are charged to opposite polarities, the greatest electrostatic field is created across the etched lines on each electrode (FIG. 7). Therefore, the potential difference across the etched lines develops an image of a density analogous to the latent image on the photoreceptive surface or xerographic drum of the automatic xerographic reproducing machine, in that the toner powder particles are attracted to the area of greatest potential difference. When the polarity of the two electrodes is reversed, this etched pattern provides a charge which repels the xerographic toner powder which is thereby cleaned by means of the continuous cascade of developer material across the electrode surface. This cleaning of the electrode surface by reversing the polarity, and thereby the potential across the etched lines of the electrically isolated portions of the transparent electrodes, is analogous to the cleaning method previously explained with reference to the photoreceptive drum.

Figure 6:
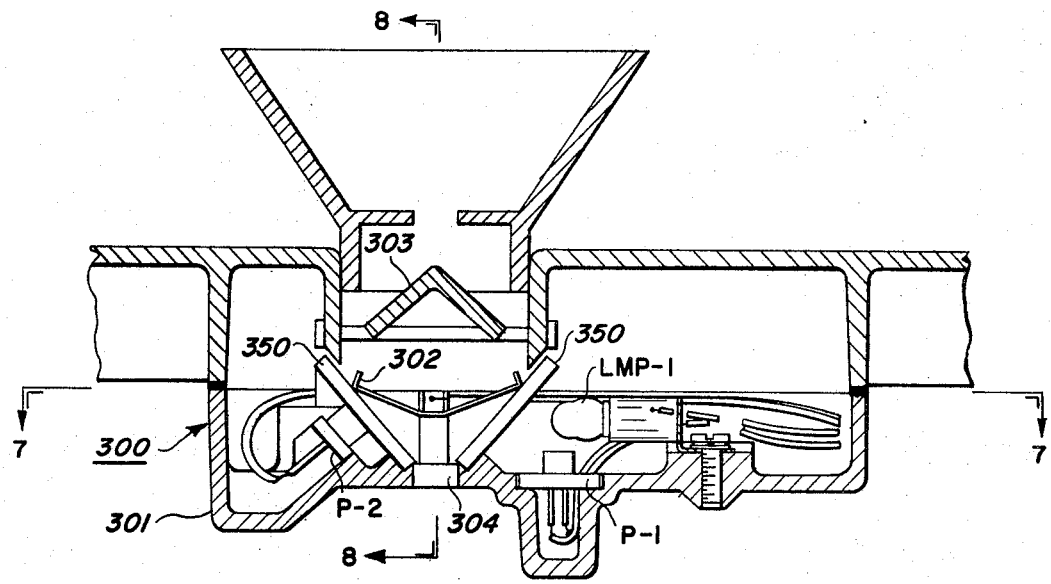
FIG. 6 is an enlarged section view of the sensor chamber and electrodes.
Figure 8:
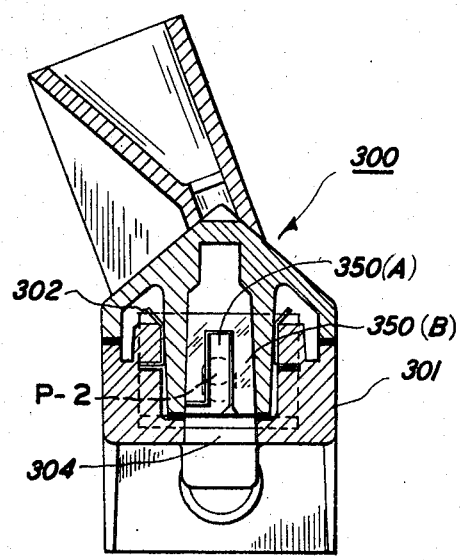
FIG. 8 is a sectional view of the simulator taken along lines 8—8 of FIG. 6.
Figure 7:
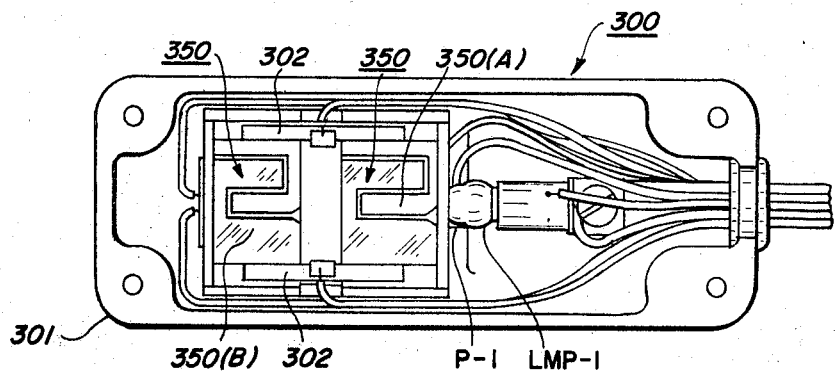
FIG. 7 is a sectional view of the sensor chamber and electrodes taken along lines 7—7 of FIG. 6.
Figure 9:
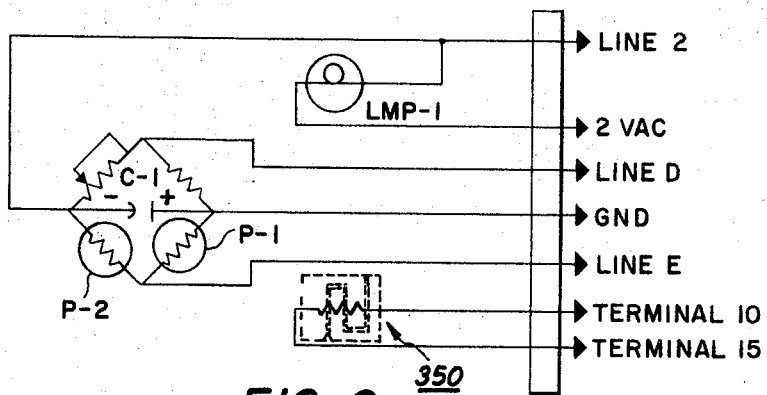
FIG. 9 is an electrical schematic of the simulator apparatus.

Positioned within the sensor chamber 300 is a photosensor P–2 positioned directly behind one of the transparent electrodes 350, and more specifically area 350(a), in the light path emanating from the source LMP-1 which is positioned behind the other transparent electrode 350 to form a light path passing through both electrodes and terminating at the photosensor P-2 as best shown in FIGS. 6, 7, and 8. When the polarity of area 350(a) of the electrodes, as determined by the terminals 10 and 15, is switched to that opposite to the toner powder, toner powder will be attracted between the etched lines of the two electrically siolated portions of the electrodes through the light path, thereby increasing the resistance of the photosensor P-2. After a symmetrical half-cycle time of approximately 4½ seconds, as determined by the low frequency unijunction oscillator Q13 and flip-flop dividers Q6 and Q5 respectively, the polarity is reversed to repel the toner powder from area 350(a) of each electrode positioned in the light path of the photosensor P-2 which, along with the scrubbing of the image area by the cascading developer material, cleans the electrode surface. Thus, the resistance of the photosenor P-2 is coupled into a conventional bridge circuit whereby the resistance change is interpreted in terms of voltage change, so that a high resistance of the photosensor P-2 indicates a dense image, causing a voltage increase to be developed from the bridge circuit (FIG. 9). Similarly, as the resistance of the photosensor P-2 decreases due to the electrostatic repulsion and scrubbing of the image area by the cascading developer material, the voltage from the bridge circuit is decreased. The cyclic resistance change of photocell P-2 creates a waveform from the bridge circuit which is essentially sawtooth in shape (FIG. 5). During the approximate 4½ second "attract" half-cycle toner powder is attracted to areas 350(a) of the transparent electrodes and during the "erase" half-cycle the image is erased, giving a total of nine seconds for one complete attract and erase cycle. The output from the bridge circuit (sensor input line 2 of FIG. 4(b)) is coupled into the control circuit to determine when the toner dispensing motor MOT-1 is to be energized. This rise and fall of the output voltage from the bridge circuit due to the cyclic attraction and repulsion of the toner powder from the electrode surface is coupled into the base of the threshold detector transistor Q19 (a two state, high gain linear amplifier functioning as a switch).

In order for the threshold detector transistor Q19 to conduct, the voltage between the base of transistor Q19 and ground must be greater than the voltage from the arm of the threshold adjustment potentiometer R24 to ground. As the resistance of R24 is increased, the positive bias in the emitter circuit is increased and the base voltage of transistor Q19 must likewise be increased in order to overcome this emitter bias and allow transistor Q19 to conduct. For a particular setting of the potentiometer R24, the threshold level, and therefore the density of the image, can be varied in accordance with the potentiometer setting.

If the voltage from the bridge circuit (FIG. 9) which is coupled into the control circuit (line 2), is insufficient to overcome the emitter bias on threshold detector transistor Q19, indicating a low toner concentration, the transistor will be nonconducting and therefore prevent threshold detector transistor Q20 from turning on. Thus with threshold detector transistor Q20 in a non-conducting state, a "0" state will be placed on the threshold input terminal (3) of the motor gate Q1. This "0" state on the threshold input terminal of motor gate Q1 (functioning upon turn on as a "NAND" gate) sets the output of Q1 to a "1" state when all inputs are at a low state. At the end of the half-cycle in which a toner powder image is built on the transparent electrodes of the simulator or sensor chamber 300, the second flip-flop divider Q5 goes from a "1" to a "0" state thereby providing a "0" state at its corresponding input (2) to the motor gate Q1. Therefore, if the latching input (1) to Q1 is at a "0" state, the motor gate will conduit, providing a "1" output which is coupled to the base of transistor Q10. This causes transistor Q10 to conduct, energizing toner dispenser motor control relay K-1, closing its contacts to actuate the toner dispenser motor MOT-1 which dispenses toner powder into the developer mixture. The toner dispenser motor MOT-1 will dispense toner for approximately 2¼ seconds, this interval being determined by the turn-off signal to the latching input (1) of motor gate Q1 which is generated by the positive-going pulse input from flip-flop divider Q6 to clear motor gate Q1.

During the portion of the half-cycle in which the toner powder is being attracted to area 350(a) of the electrode surface, the attraction of the toner powder on the electrode surface increases the resistance to the photosensor P-2 which causes an increase in the voltage output from the bridge circuit which is connected to the control circuit (line 2) shown in FIG. 4(b). This voltage change is coupled to the base of threshold detector transistor Q19 and if the voltage is greater than the emitter bias on transistor Q19 (as determined by the potentiometer R24), Q19 will conduct, drawing the base of threshold detector Q20 to a "0" state allowing Q20 to conduct to place the threshold input terminal (3) of motor gate Q1 at a "1" state. When there is sufficient toner powder in the developer mixture, this high input to the threshold input terminal of the motor gate Q1 will prevent the motor gate from conducting since all inputs will not be in the "0" condition. When the toner powder level in the developer mixture is insufficient for a predetermined level of density for development of the xerographic image on the photoreceptive surface, the voltage output from the bridge circuit will be insufficient to overcome the emitter bias of the threshold detector transistor Q19 and, therefore, the input to the threshold terminal (3) of the motor gate Q1 will remain at the "0" condition. Upon coincidence of the "0" input to the (2) and the latching (1) terminals, the motor gate Q1 will be energized to provide a high output to the base of transistor Q10 energizing the motor dispensing relay K-1. When the dispenser motor is energized, the dispenser will continue operating until the motor gate is cleared by the change in the output from the first flip-flop divider Q6 (coupled to latching input (1) of the motor gate) thereby ending the toner dispensing interval for that particular cycle. At that time the transparent electrodes will be cycled to a polarity for repelling the toner powder from the electrode surface, cleaning the electrode due to this repulsion and the scrubbing action of the cascading developer material. After the approximately 4½ second erase cycle, an image will again be built on the electrode surface and the output from the bridge circuit fed into the sensor to be compared to the emitter bias of the threshold detector transistor Q19 to again determine whether or not additional toner powder is needed in the developer mixture.

This aforementioned operation will continue during the course of the operation of the automatic reproducing machine and its normal multiple-copy reproduction operation.

In order to prevent the machine from being overtoned (i.e. having an excess of toner powder added to the developer mixture due to false signals such as might occur during the reproduction of a small number of copies) it is important that the polarity of the transparent electrodes be maintained such that the toner powder will be attracted to the electrode surface during machine shutdown. If one or a few copies were reproduced during the portion of the cycle in which an image is being built on area 350(a) of the electrode, a false signal would be provided to the threshold detector transistor Q19 due to an insufficient time being allowed for the toner powder to build to a proper density. To prevent this spurious triggering of the dispenser motor, and to obtain a uniform starting point for the comparison, when the automatic xerographic reproducing machine completes the number of copies set by the machine operator, or in any event in which the machine is stopped, line 108 of the control circuit will be energized. This AC voltage on line 108 is rectified by rectifier CR20 and filtered by capacitor C10 to place a positive voltage or a "1" state at the input of inverter Q24–B which is coupled to NOR gate Q2–B of the synchronizer flip-flop Q2. The output of Q24–B is also coupled through inverter Q24–A to back bias CR19, allowing capacitor C13 to begin charging to its RC time constant. When the capacitor C13 is charged sufficiently to fire unijunction Q12, a positive voltage pulse or a "1" state will be coupled into NOR gate Q2–A of the synchronizer flip-flop Q2, and the "0" state output of Q2–A is coupled to NOR gate Q2–B of the synchronizer flip-flop.

This resulting "1" output from Q2–B is coupled both to synchronizer flip-flop Q3, hereinafter described in detail, and back to NOR gate Q2–A. The coupling of the high output to Q2–A latches the NOR gate output to a "0" condition thereby holding the output of NOR gate Q2–B in a "1" state. This high output of Q2–B is maintained until the output of Q24–B becomes high thereby resetting the Q2–B output to a low state.

As previously stated, the "1" output from Q2–B is also coupled to the synchronizer flip-flop Q3. This "1" is inverted by the NOR gate of Q3 and restored to a "1" state by the inverter of Q3. This high, or "1" state output, is coupled back to the NOR gate of the high voltage steering gate Q4 whose output couples a low voltage to the bases of the high voltage switch transistors Q15 and Q16 to place them in a non-conducting state, and is also inverted by the inverter of high voltage steering gate Q4 to drive the bases of high voltage switch transistors Q17 and Q18 to a "1" state thereby allowing the transistors to conduct, placing terminal 10 at ground and terminal 15 at approximately 290 volts.

When the automatic xerographic reproducing machine completes its shutdown, lines 47 and 108 become de-energized. De-energization of line 47 results in the positive voltage on the reset portion Q7–A of reset/inverter Q7 going to a low state thereby placing the reset line R in a "1" state which places the base of the oscillator synchronizing transistor Q14 in a "1" state allowing the transistor to conduct, thereby discharging the capacitor C5 and preventing the low frequency unijunction oscillator Q13 from conducting or from providing an output to inverter Q7–B. When reset line R is placed in a "1" state the flip-flop dividers Q6 and Q5 will be cleared, placing their outputs at a "0" state. Reset input to the NOR gate of Q3 being "1," the output from the inverter of Q3 is also "1," holding the NOR gate output of Q4 at "0" and maintaining the proper attract cycle polarities on high voltage terminals 10 and 15. As soon as the machine is again energized (line 47 is energized) the voltage will be inverted by Q7–A of the reset/inverter placing a low on the reset line R which removes the "1" state on the NOR gate of voltage steering gate Q4–A allowing the control circuit to immediately place the transparent electrodes in the erase cycle.

When the AC voltage is removed from line 108 the rectified voltage (through CR20) input to inverter P24–B is at the "0" state. The high or "1" output from the inverter is coupled to NOR gate Q2–B of the synchronizer flip-flop Q2 to provide a "0" output to the NOR gate of synchronizer flip-flop Q3 and remove the latch from NOR gate Q2–A on Q2–B. The input to this NOR gate of Q3 from reset line R is at a "1" state, providing a "0" at the output which is inverted by the inverter of Q3 placing a high or "1" state on one of the inputs to the NOR gate of the high voltage steering gate Q4. The output of this gate is coupled to the high voltage switch transistors Q15, 16, 17, and 18 allowing transistors Q17 and Q18 to conduct and turning off transistors Q15 and 16, placing terminals 10 and 15 at "0" and 290 volts, respectively. This voltage applied to these terminals will insure that the transparent electrodes are in the appropriate portion of the sensing cycle, that is, in the build cycle to again, upon energization of line 47, allow the sensor to start operation on the cleaning half-cycle. Energizing line 47 drops reset line R to a "0" to begin operation of the sensing cycle as previously described.

Even though the system herein described automatically senses the concentration of the toner powder in the developer mixture and requires no skill on the part of the operator, there is a provision for the operator to overtone the developer mixture if desired, for example, if the automatic xerographic reproducing machine is reproducing from a very light original document. The operator can actuate a manual override button, thereby providing a 110 volt AC input to line 13 to dispense toner powder into the developer mixture for a fixed time period, preferably, 10 seconds. The depressing of the manual override button places a rectified AC voltage at the input of a ten-second monostable multivibrator providing a "1" state output which is coupled to the base of motor drive transistor Q11 overcoming the bias on the transistor and allowing it to conduct, energizing relay K–1 for a fixed time as determined by the time constant of the one shot multivibrator Q8. At the end of this time, the ten-second monostable multivibrator will return to its stable state providing a "0" input to the base of motor drive transistor Q11 turning the transistor off, and the automatic mode of operation as heretofore described will again be resumed.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for controlling the concentration of toner powder in xerographic developer material comprising
   a light transmittent electrically conductive electrode,
   means to pass xerographic developer material containing toner powder over the surface of said electrode,
   means for dispensing toner powder into the developer material in response to an electrical control signal,
   circuit means coupled to said electrode for cyclically alternating the voltage level thereon for attracting and repelling toner powder contained in the developer material to and from the electrode surface,
   illuminating means to direct a light beam through said electrode and xerographic developer material passing thereover,
   a photosensor positioned to form the termination point of the light beam passing through said electrode and developer material,
   a threshold detector electrically coupled to said circuit means and said photosensor to provide a control signal for energizing said dispensing means when the toner powder contained in the developer material is below a concentration sensed by said threshold detector, and
   means to activate said toner powder dispenser independently of the toner powder concentration sensed by said threshold detector.

2. Apparatus for controlling the concentration of toner powder in xerographic developer material comprising
   a light transmittent electrically conductive electrode,
   means to pass xerographic developer material containing toner powder over the surface of said electrode,
   means for dispensing toner powder into the developer material in response to an electrical control signal,
   circuit means coupled to said electrode for cyclically alternating the voltage level thereon for attracting and repelling toner powder contained in the developer material to and from the electrode surface, a second light transmittent electrically conductive electrode electrically connected in parallel to a said first light transmittent electrically conductive electrode and positioned in contact with said passing xerographic developer material, a photosensor positioned to form the termination point of the light beam passing through said electrodes and developer material, and a threshold detector electrically coupled to said circuit means and said photosensor to provide a control signal for energizing said dispensing means when the toner powder contained in the developer material is below a concentration sensed by said threshold detector.

3. Apparatus for controlling the concentration of toner powder in xerographic developer material comprising
a light transmittent electrically conductive electrode including two electrically isolated portions thereof,
means to pass xerographic developer material containing toner powder over the surface of said electrode,
means for dispensing toner powder into the developer material in response to an electrical control signal,
circuit means coupled to said electrode for cyclically alternating the voltage level thereon for attracting and repelling toner powder contained in the developer material to and from the electrode surface,
said circuti means includes a source of electrical signals having a substantially uniform repetition rate coupled to switch control means for alternating the voltage level of said electrode,
means coupled to said switch control means actuatable to maintain one of said portions of said electrode at a predetermined voltage level and to terminate said electrical signals having a substantially uniform repetition rate,
a photosensor positioned to form the termination point of the light beam passing through said electrode and developer material, and
a threshold detector electrically coupled to said circuit means and said photosensor to provide a control signal for energizing said dispensing means when the toner powder contained in the developer material is below a concentration sensed by said threshold detector.

4. Apparatus for controlling the concentration of toner powder in xerographic developer material comprising
a light transmittent electrically conductive electrode,
means to pass xerographic developer material containing toner powder over the surface of said electrode,
means for dispensing toner powder into the developer material in response to an electrical control signal,
circuit means including a first and second pulse divider coupled to said electrode for cyclically alternating the voltage level on said electrode in accordance with a timed relationship as determined by said first and second pulse divider for attracting and repelling toner powder contained in the developer material to and from the electrode surface,
a photosensor positioned to form the termination point of the light beam passing through said electrode and developer material, and
a threshold detector electrically coupled to said circuit means and said photosensor to provide a control signal for energizing said dispensing means when the toner powder contained in the developer material is below a concentration sensed by said threshold detector.

5. The apparatus of claim 4 including coincidence means responsive to the coincidence of enabling signals from said pulse dividers and said threshold detector to activate said means for dispensing toner powder into the developer material.

6. The apparatus of claim 5 wherein said coincidence means is disabled by a termination of the enabling signal from said pulse dividers.

7. The apparatus of claim 5 wherein said coincidence means is responsive to the coincidence of enabling signals from said first pulse divider, said second pulse divider and said threshold detector.

8. The apparatus of claim 7 wherein said coincidence means is disabled by a termination of the enabling signal from said first pulse divider.

9. A method of controlling the concentration of toner powder in xerographic developer material comprising
moving a quantity of xerographic developer material containing toner powder in a path of movement in contact with a light transmittent electrode,
passing a light beam through said moving developer material and said electrode into a photosensor,
generating an electrical output from said photosensor related to the intensity of the light beamed thereto,
alternating the polarity of said electrode to cyclically attract and repel toner powder from said electrode surface,
comparing the electrical output from the photosensor with a predetermined level indicative of a depletion of the concentration of toner powder in the xerographic developer material,
generating an electrical enabling signal in response to the compared electrical signal output from the photosensor indicating depletion of the concentrated toner powder in the xerographic material, and
coupling the electrical enabling signal generated to coincidence means for activating a toner powder dispensing mechanism upon coincidence of signals thereto.

10. The method of claim 9 including the steps of generating a series of enabling pulses having a substantially uniform repetition rate, and
coupling said series of enabling pulses to the coincidence means.

11. The method of claim 10 including the step of disabling the coincidence means by terminating the series of substantially uniform repetition rate enabling pulses.

References Cited

UNITED STATES PATENTS

| | | | |
|---|---|---|---|
| 3,399,652 | 9/1968 | Gawron | 222—57 X |
| 3,376,853 | 4/1968 | Weiler et al. | 222—57 X |
| 3,409,901 | 11/1968 | Dost et al. | 118—367 X |

ROBERT B. REEVES, Primary Examiner

H. S. LANE, Assistant Examiner

U.S. Cl. X.R.

118—637; 137—93; 200—61.02; 222—57, 76